(12) United States Patent
Pardoe et al.

(10) Patent No.: US 8,074,116 B2
(45) Date of Patent: Dec. 6, 2011

(54) EXCEPTION RAISED NOTIFICATION

(75) Inventors: Andrew J. Pardoe, Bellevue, WA (US); Gaurav Khanna, Redmond, WA (US); Michael M. Magruder, Carnation, WA (US); Yi Lin, Sammamish, WA (US); Jeffrey C. Schwartz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 416 days.

(21) Appl. No.: 12/436,175

(22) Filed: May 6, 2009

(65) Prior Publication Data
US 2010/0287414 A1 Nov. 11, 2010

(51) Int. Cl.
G06F 11/00 (2006.01)
(52) U.S. Cl. .......... 714/38.1; 714/48; 717/127; 712/244
(58) Field of Classification Search ............. 714/2, 38.1, 714/48, 57; 717/127, 131; 712/244
See application file for complete search history.

(56) References Cited

U.S. PATENT DOCUMENTS

| | | | | |
|---|---|---|---|---|
| 5,297,263 | A * | 3/1994 | Ohtsuka et al. | 712/244 |
| 5,537,559 | A * | 7/1996 | Kane et al. | 712/244 |
| 5,761,407 | A * | 6/1998 | Benson et al. | 714/37 |
| 6,802,067 | B1 | 10/2004 | Camp et al. | |
| 7,146,544 | B2 * | 12/2006 | Hsu et al. | 714/57 |
| 7,272,705 | B2 * | 9/2007 | Revilla et al. | 712/244 |
| 7,522,516 | B1 * | 4/2009 | Parker | 370/216 |
| 7,574,692 | B2 * | 8/2009 | Herscu | 717/116 |
| 7,634,778 | B2 * | 12/2009 | Mosier et al. | 719/318 |
| 7,814,372 | B2 * | 10/2010 | Huang et al. | 714/38.1 |
| 7,861,120 | B2 * | 12/2010 | Cui | 714/38.1 |
| 7,958,497 | B1 * | 6/2011 | Lindo et al. | 717/128 |
| 2003/0037227 | A1 * | 2/2003 | Nomura | 712/244 |
| 2004/0268332 | A1 | 12/2004 | Mitsumori et al. | |
| 2005/0223205 | A1 * | 10/2005 | Revilla et al. | 712/244 |
| 2005/0273490 | A1 | 12/2005 | Shrivastava et al. | |
| 2006/0095812 | A1 * | 5/2006 | Gerard et al. | 714/38 |
| 2006/0101411 | A1 * | 5/2006 | Selitrennikoff et al. | 717/127 |
| 2006/0168478 | A1 * | 7/2006 | Zakonov | 714/38 |
| 2007/0022322 | A1 | 1/2007 | Chen et al. | |
| 2009/0006908 | A1 * | 1/2009 | Allen | 714/57 |

(Continued)

OTHER PUBLICATIONS

Cabral, et al."Exception Handling: A Field Study in Java and .NET", Retrieved at<<http://eden.dei.uc.pt/~bcabral/ExceptionHandling_A_Field_Study_camready.pdf>>, pp. 25.

(Continued)

Primary Examiner — Yolanda L Wilson
(74) Attorney, Agent, or Firm — Boswell IP Law; J. Mason Boswell

(57) ABSTRACT

An exception notification system is described herein that provides an early notification that a software exception has occurred before exception handling code has run. The exception notification system receives a registration request from program code to register a handler to receive an early notification when an exception occurs. When an exception occurs, the system raises an event that calls each registered handler. After the handler returns, the system performs normal exception handling, so that the early notification does not change existing exception-handling behavior. The exception notification system allows a program to inspect and log an exception before the program state has been modified by exception handling. The program code can capture detailed information about the cause of the exception to enable further offline analysis. Thus, the exception notification system allows developers to improve their programs by receiving more information about unexpected conditions in the program code.

17 Claims, 3 Drawing Sheets

U.S. PATENT DOCUMENTS

2009/0013208 A1* 1/2009 DiMuzio .......................... 714/2
2009/0070638 A1* 3/2009 Huang et al. .................... 714/57
2009/0158099 A1* 6/2009 Cui ................................. 714/57

OTHER PUBLICATIONS

Malladi Satyavathi, "A Thread Debugger for Testing and Reproducing Concurrency Scenarios", Retrieved at<<http://citeseerx.ist.psu.edu/viewdoc/download?doi=10.1.1.113.7449&rep=rep1&type=pdf>>, pp. 66.

Nogiec Jerzy, "Toward an Architecture of a Component-Based System Supporting Separation of Non-Functional Concerns", Retrieved at<<http://citeseerx.ist.psu.edu/viewdoc/download?doi=10.1.1.104.6525&rep=rep1&type=pdf>>, International Journal of Computer and Information Science and Engineering vol. 1 No. 3 2007 ISSN 1307-4164, pp. 144-151.

Edwards, et al. "Contract-Checking Wrappers for C++ Classes", Retrieved at<<http://ieeexplore.ieee.org/stamp/stamp.jsp?arnumber=1359771&isnumber=29818>>, IEEE Transactions on Software Engineering, vol. 30, No. 11, Nov. 2004, pp. 794-810.

"Design Guidelines, Managed code and the .NET Framework", Retrieved at<<http://blogs.msdn.com/brada/archive/2004/10/24/247002.aspx>>, pp. 5.

Stall Mike, "Beware of the Vectored Exception Handler and Managed Code", Retrieved at<<http://blogs.msdn.com/jmstall/archive/2006/05/24/avoid_vectored_exception_handler_managed_code.aspx>>, pp. 3.

"International Search Report", Mailed Date: Nov. 29, 2010, Application No. PCT/US2010/033247, Filed Date: Apr. 30, 2010, pp. 9.

* cited by examiner

EXCEPTION RAISED NOTIFICATION

BACKGROUND

Computer programs typically contain two types of code: instructions that carry out the purpose of the program and error handling code that contains instructions for recovering from or responding to unexpected or unusual conditions that occur. Error handling may include addressing anything from a file open failing because the file is not at a requested location to accessing memory that does not belong to the program (e.g., memory that the program did not allocate or has already freed). Software exceptions are one type of error notification paradigm. An exception is the signal raised when a condition is detected that was not expected in the normal execution of a program thread. Many agents can detect incorrect conditions and raise exceptions. For applications running in a managed environment, exceptions can be raised by program code (or library code the program uses), the runtime engine, and unmanaged code that the application invokes. Exceptions allow the developer to write fast and straightforward software code for the normal case, and contain code for handling errors (e.g., exceptions) in a predefined area. Using exceptions, a program typically surrounds a block of instructions with a "try" block and when an abnormal condition occurs, the program leaves the try block and executes one or more conditionally executed blocks.

Exceptions raised on a thread of execution follow the thread through native and managed code and across application domains (e.g., Microsoft .NET AppDomains). If the program does not handle an exception, the exception is typically presented to the operating system and treated as an unhandled exception. A program can handle an exception if it understands the conditions that caused the exception to occur. Exceptions represent a wide range of unexpected conditions during execution of a program. Exceptions may occur at a variety of levels when a program is viewed as a logical stack of layers. For example, the operating system may provide exceptions (e.g., structured exception handling (SEH)), an underlying runtime may provide exceptions (e.g., the C-language runtime or Microsoft .NET Common Language Runtime (CLR)), and the program itself may provide exceptions defined by the language used to create the program (e.g., C-language exceptions, Microsoft .NET exceptions, and so forth). For higher-level languages, the environment may wrap each of these exceptions into one or more types recognized by the language of the program. For example, Microsoft .NET represents any native exception as a specific managed exception that inherits from the Microsoft .NET Exception class.

Software has grown so complex that component reuse is common and many software programs invoke external components or include components (e.g., by static linking) internally that were not written or verified by the program author. For example, a data mining application may invoke a database library for establishing connections to a database and receiving data from the database in response to queries. In addition, programs may include whole platform paradigms that differ from the main paradigm of the program. For example, a native C++ application may invoke managed Microsoft .NET software classes to perform certain actions. Any part of such complex systems may include errors and exceptions that other parts of the system do not anticipate or handle. For example, if a native application invokes managed code, and the managed code hits an exception or other failure, the native application state may be corrupted or the native application may terminate because the native application is unaware of or was not designed to handle the failure. Conversely, a managed application may call into native code that corrupts the application state or experiences some other failure.

Often the most relevant information about an exception for offline analysis is knowing that the exception occurred. Unfortunately, it is difficult for an application, in particular one that includes one or more third-party components or add-ins, to detect every exception and log information about the exception. For example, software code may catch the exception and handle it (correctly or incorrectly) making it impossible for other application code to detect that the exception occurred. If the application is run in a debugger, debuggers commonly provide developers with a notification of a raised exception before the program is allowed to process the exception. However, running applications in a debugger is not practical in regular consumer scenarios.

Various mechanisms for handling exceptions outside of the normal application flow exist today. As one example, applications can provide unhandled exception filters that receive any exception that was not otherwise caught by an application. As another example, Microsoft Windows provides a mechanism called Vectored Exception Handling that allows a programmer to add a filter to a chain of filters executed by the OS when a native exception is raised. Hooking this from managed code can allow similar functionality. However, this is not recommended, and application exception processing may cause changes in the program state, that make it difficult for an unhandled exception filter to log enough relevant details about the cause of the exception. The delivery of an exception to a program's exception handling regions (normally catch or filter blocks) involves the exception system performing a significant amount of work. Program code cannot examine an exception without accepting the exception for processing, which is an action that can modify the exception state and program state before the handler receives the exception.

SUMMARY

An exception notification system is described herein that provides an early notification that a software exception has occurred before application exception handling code has run. The system allows a developer a chance to inspect the program state that caused the exception before the runtime's exception system begins a search for handlers. The exception notification system receives a registration request from program code to register a handler to receive an early notification when an exception occurs. When an exception occurs, the system raises an event that calls each registered handler. After the handler returns, the system performs normal exception handling, such that the early notification does not change existing exception-handling behavior. The exception notification system allows a program to inspect and log an exception as a developer might do if the exception occurs while the program is running under a debugger. By enabling the developer to inspect the exception and program state programmatically, the program code can capture detailed information about the cause of the exception to enable further offline analysis. In addition, the notification is received for all threads associated with a program so that the program can detect and store information about exceptions raised outside the developer's own code. Thus, the exception notification system allows developers to improve their programs by receiving more information about unexpected conditions in the program code.

This Summary is provided to introduce a selection of concepts in a simplified form that are further described below in the Detailed Description. This Summary is not intended to

DETAILED DESCRIPTION

An exception notification system is described herein that provides an early notification that an exception has occurred before exception handling code has run. The system allows a developer a chance to inspect the program state that caused the exception before the runtime's exception system begins a search for handlers. The exception notification system receives a registration request from program code to register a handler to receive an early notification when an exception occurs. For example, the program code may provide a handler that records state for offline diagnosis without impact on normal exception handling code. Programs normally perform custom logging at program termination. However, the exception notification system allows a program to perform logging while the program is in the state that raised the exception. When an exception occurs, the system raises an event that calls each registered handler. After the handler returns, the system performs normal exception handling, so that the early notification does not change existing exception-handling behavior. Previously a developer would have to use a catch or filter block, which affects program exception handling semantics.

The exception notification system allows a program to inspect and log an exception as a developer might do if the exception occurs while the program is running under a debugger. However, the system does not use a debugger or incur the overhead associated with running a process in the debugger. By enabling the developer to inspect the exception and program state programmatically, the program code can capture detailed information about the cause of the exception to enable further offline analysis. In addition, the notification is received for all threads associated with an application (e.g., within a Microsoft .NET AppDomain), so that the application can detect and store information about exceptions raised outside the developer's own code (e.g., for exceptions in OS, runtime, or third party library code). Thus, the exception notification system allows developers to improve their applications by receiving more information about unexpected conditions in the program code.

Figure 1:
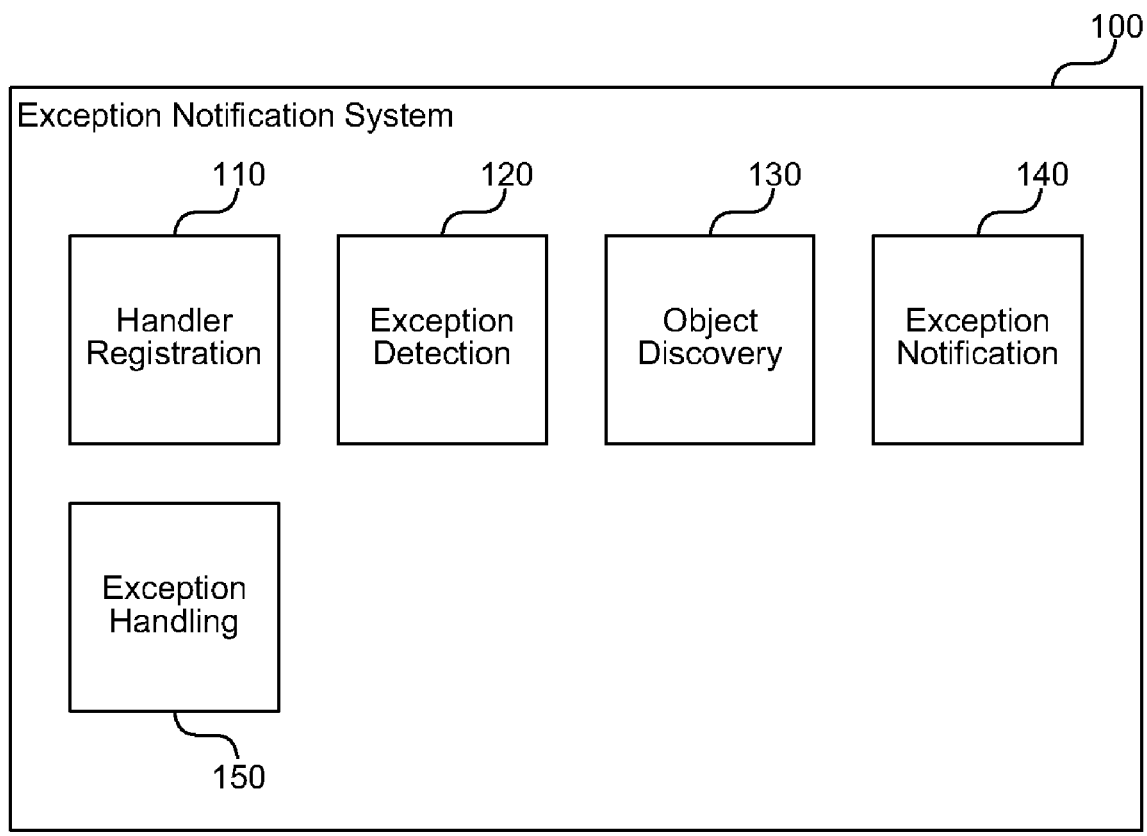
FIG. 1 is a block diagram that illustrates components of the exception notification system, in one embodiment.

FIG. 1 is a block diagram that illustrates components of the exception notification system, in one embodiment. The system 100 includes a handler registration component 110, an exception detection component 120, an object discovery component 130, an exception notification component 140, and an exception-handling component 150. Each of these components is described in further detail herein.

The handler registration component 110 receives requests from an application to register a handler for an early notification provided by the system 100 when an exception occurs. The component 110 may allow the application to register multiple handlers that the system 100 will invoke when an exception occurs. The handler typically satisfies a specification provided by the handler registration component 110, including accepting certain parameters and being part of a particular class. For example, using Microsoft .NET the component 110 may expect that the registered handler is a delegate of a type defined in the AppDomain class that accepts a parameter of type Exception. In addition, the handler registration component 110 may determine a security level of the requestor. For example, the component 110 may not accept registrations from requesters that are not marked Security Critical (or equivalent). In some embodiments, the system 100 may also enforce similar restrictions on the handler itself or may allow handlers to be at a lower security level (e.g., Transparent or equivalent). Following is an example definition of an event handler for the handler described herein.

```
public sealed class AppDomain {
    public event EventHandler<FirstChanceExceptionEventArgs>
        FirstChanceException;
}
public class
System.Runtime.ExceptionServices.FirstChanceExceptionEventArgs
    : EventArgs {
    // Represents the exception being raised
    public Exception Exception { get; }
}
```

The exception detection component 120 detects that an exception occurred while a program was executing. Software code can raise an exception in frame or can receive the exception in frame. A frame refers to the context of execution. When software code executing on a thread raises an exception, exception processing logic raises the exception in frame. In certain other cases, such as when a blocked operating system call fails or when a thread invokes software code across a Component Object Model (COM) Interop boundary, exception processing logic receives the exception in frame even though it may initially have been raised elsewhere. An exception may start with a call to the operating system exception raising function (e.g., for Microsoft Windows, RaiseException). The operating system walks the thread stack to identify handlers for the exception and invokes an appropriate handler. The exception notification system 100 has a handler on the stack that the operating system calls, allowing the exception detection component 120 to detect the exception.

The object discovery component 130 looks up the exception state in response to a detected exception and identifies an application object associated with the current thread. For example, if the application is a Microsoft .NET application, then the CLR detects the exception and identifies a managed object and AppDomain associated with the exception state. The runtime also determines a type of the exception in a hierarchy of exception classes. For example, the runtime may represent operating system structured exceptions to managed exception classes that an application can detect and handle (e.g., a System.AccessViolationException class).

The exception notification component 140 calls registered application handlers to notify the handlers about the detected exception. For example, the component 140 may loop through each handler and call each one serially. The exception notification component 140 may provide an exception object or other parameter to the registered handler through which the handler can retrieve additional information about the cause of the exception. For example, when the system 100 is used with Microsoft .NET, the CLR provides the managed exception object to handlers as a normal instance of the Exception class, with all of the methods and properties available that are normally available when an application receives an exception in a catch block. As described previously, the exception processing may identify an AppDomain object associated with the exception state and provide the notification to a delegate of the AppDomain.

The exception-handling component 150 performs traditional exception processing after the registered application handlers have been notified. Those of ordinary skill in the art will recognize various traditional exception processing that the component 150 may perform. For example, the component 150 may perform a standard two-pass exception process. During the first pass, the component 150 walks the stack (e.g., using information stored during just-in-time (JIT) compilation) to find an exception handling block in the application code as close on the stack to where the exception occurred that will accept an exception of the raised type. During the second pass, the component 150 calls handlers for cleaning up application state from the bottom of the stack (where the exception occurred) to the frame of the accepting handler. This may result, for example, in calling C++ destructors for objects going out of scope, finally blocks, fault blocks, and so forth. The second pass concludes with the component 150 calling the accepting handler identified during the first pass to allow the handler to process the exception. However, the system 100 is not limited to any particular form of exception processing after the exception notification. For example, the system may perform a single pass or other model instead of the two-pass model described as an example above.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
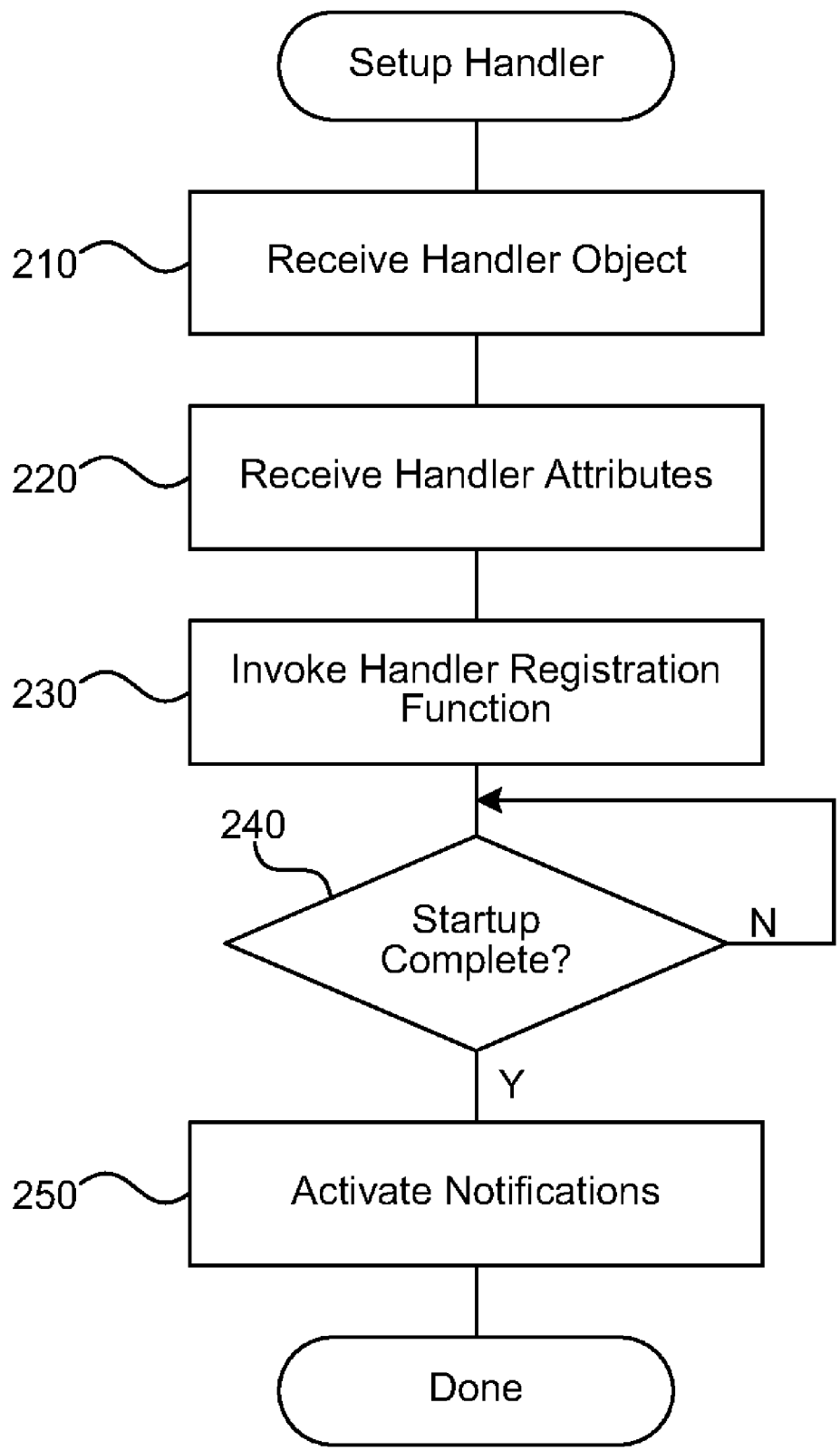
FIG. 2 is a flow diagram that illustrates the processing of the system to receive a handler to which to provide early notifications of exceptions, in one embodiment.

FIG. 2 is a flow diagram that illustrates the processing of the exception notification system to receive a notification handler to which to provide early notifications of exceptions, in one embodiment. Beginning in block 210, the system receives a notification handler object. An application module may provide a class of which the notification handler is a delegate of a type in a particular class. For example, using Microsoft .NET, the notification handler may be a delegate of a type in the AppDomain class associated with an application. Continuing in block 220, the system receives one or more notification attributes. For example, the notification handler may be attributed with one or more types or categories of exceptions that the notification handler can process (e.g., a corrupted state exception). Types may refer to classes in a class hierarchy of exceptions, whereas categories may refer to exceptions that the system distinguishes regardless of type. For example, a corrupted state exception may be one category of exception, regardless of type.

Continuing in block 230, the system invokes a handler registration function that adds the received handler object to a list of registered handlers to call in response to an exception occurring. In some embodiments, the system may register the handler automatically by virtue of the handler's existence on a class of a particular type (e.g., through inheritance where the system provides a default empty method and the application's override is called if it exists). Following these steps, the handler object is setup to be called when an exception occurs. The following steps illustrate additional processing that an application can perform to avoid, for example, receiving exception notifications during application startup, which may generate many uninteresting exceptions.

Continuing in decision block 240, if the system detects that startup of an application containing the handler object is complete, then the system continues at block 250, else the system loops to block 240 to wait for startup to complete. The system may detect that startup is complete through another notification provided by the operating system or runtime. Continuing in block 250, the system activates calling of the registered handler object. The system may provide a method that an application can call to toggle early exception notification on and off during the application's execution. For example, the application may turn on early exception notification before performing certain types of operations, or (as illustrated here) after application startup is complete. After block 250, these steps conclude.

Figure 3:
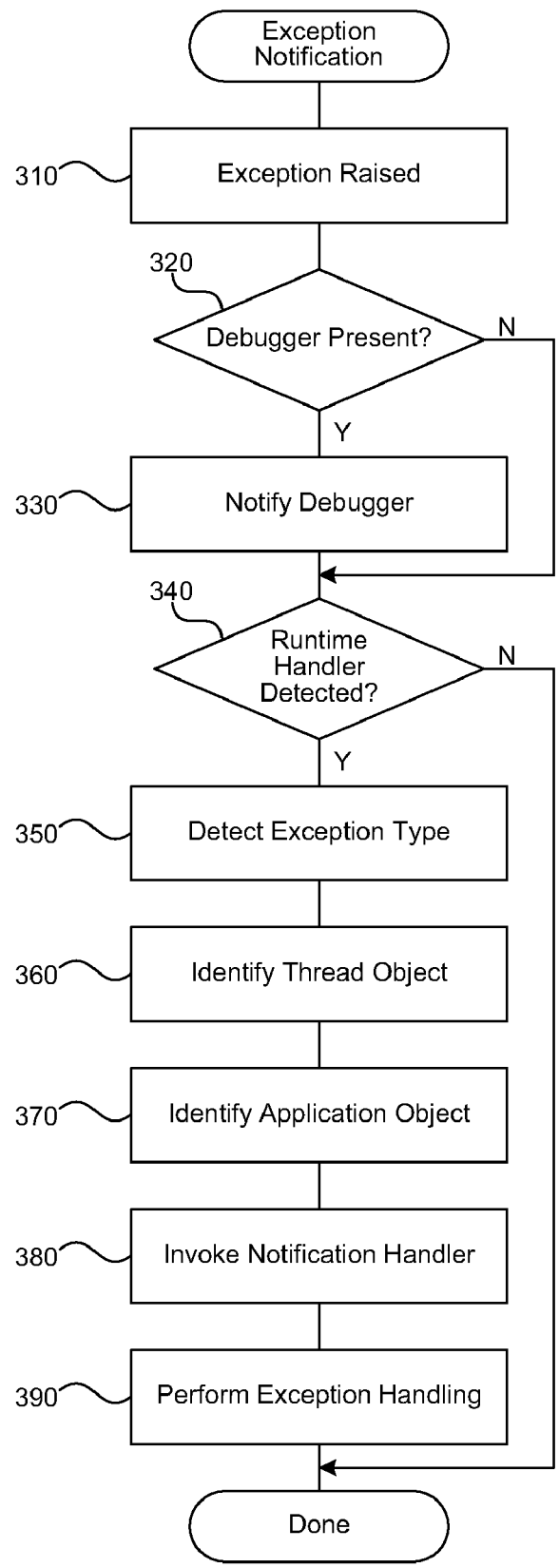
FIG. 3 is a flow diagram that illustrates the processing of the system when an exception is raised, in one embodiment.

FIG. 3 is a flow diagram that illustrates the processing of the exception notification system when an exception is raised, in one embodiment. Beginning in block 310, the exception notification system receives notification that an exception has been raised. For example, notification of the exception being raised may occur within an operating system before an application or runtime has received the exception for processing. For example, software code may call an operating system function, such as RaiseException provided by Microsoft Windows. Continuing in decision block 320, if the system detects that a debugger is present, then the system continues at block 330, else the system jumps to block 340. This step may be part of the operating system's initial processing of an exception, during which the operating system provides a first-chance notification to an attached debugger if one is present. Continuing in block 330, the system notifies the attached debugger to give the debugger the first option to process the exception. The debugger may allow a user to continue executing past the exception or to redirect execution to another location in the application code. There may be multiple cases in which the system notifies the debugger. First, the operating system may give the debugger a chance to be notified of exceptions that occur. Second, after the runtime's exception handler is invoked, the system gives an attached debugger a chance before the first chance notification callbacks described herein.

Continuing in decision block 340, if the exception notification system detects a runtime exception handler associated with a frame in which the exception occurred, then the exception notification system continues at block 350, else the exception notification system completes and allows the exception to be processed in a traditional manner. The system described herein may be implemented within a runtime such as the Microsoft .NET CLR or Sun Java virtual machine (VM). Where runtimes are used, the runtime typically registers an exception handler that the operating system notifies when exceptions occur. Continuing in block 350, the system detects a type of the exception. For example, the system may map an operating system SEH code to a runtime provided type that wraps the lower level operating system provided exception. The system may also detect various runtime conditions that can occur that indicate a particular exception type, such as an exception because of a null object reference.

Continuing in block 360, the system identifies a runtime thread object associated with the exception. The runtime may provide an object that stores data about each thread managed by the runtime, and the runtime can identify the appropriate thread object from the stack frame of the thread where the exception occurred. For example, the runtime may inspect thread local storage (TLS) to locate runtime objects. Continuing in block 370, the system identifies an application object associated with the identified thread object. The system may provide early exception notifications across many threads through the application object. For example, Microsoft .NET defines an AppDomain object that represents an isolation boundary of an application. An application that hosts plug-ins may include multiple AppDomains, such as one for the host and one for each plug-in.

Continuing in block 380, the system invokes an exception notification handler associated with the identified application object. For example, an AppDomain class may include a handler delegate for receiving exception notifications. Note that the system provides the exception object to the exception notification handler before any normal exception processing takes place, so that the handler can inspect the application state at the time of the exception. Continuing in block 390, the system performs normal execution handling to process the exception. For example, the system may perform two-pass exception processing that identifies an exception handler in the frame of execution and unwinds the stack up to the identified handler to clean up allocated objects. Thus, the system provides a notification that is inserted before traditional exception processing that allows applications to receive notification of exceptions that would otherwise be difficult to receive and capture diagnostic information that may be useful for later analysis. After block 390, these steps conclude.

In some embodiments, the exception notification system operates as described herein when a program is run under a debugger. However, debuggers typically provide a first-chance exception notification to the debugger before any program code runs. This is also the case with the exception notification system. The debugger receives a first-chance exception notification directly from the operating system. If the operator of the debugger chooses to continue program execution, then the program code runs and the system described herein detects the exception, provides a notification to registered program handlers, and performs normal exception processing. If the debugger operator chooses to redirect execution (e.g., "Set Next Statement" in some debuggers) or intercept the exception, then the system may not receive the exception and neither the early notification nor normal exception processing will occur.

In some embodiments, the exception notification system detects attributes applied to a registered handler that affect which exceptions the handler receives. For example, the Microsoft .NET prepare attribute may indicate that the handler is designed to operate correctly in out of memory conditions so that the runtime provides out of memory exceptions to the handler. Calling any program code during an out of memory condition may be dangerous and some program code takes particular steps to be able to function correctly. The .NET Framework also provides constrained execution regions (CERs) that signal to the runtime to pre-allocate resources for a block of code and perform any JIT compilation in advance, so that the block of code can safely run even if resources are scarce later. Because out of memory conditions are difficult to handle, the exception notification system may not provide out of memory exceptions to a handler that does not indicate (e.g., by setting an attribute) that the handler is designed to handle such conditions. The system may also detect other attributes, such as an attribute that indicates that a handler is prepared for exceptions that indicate corrupted or potentially corrupted program state (another difficult to handle category of exception).

In some embodiments, the exception notification system avoids exception loops. An exception loop occurs when notification handler raises an exception. In the present case, any exception raised in a registered notification function may cause the system to invoke the function again to be notified of the second exception. If the handler again raises the exception, then this process repeats infinitely until the stack overflows or some other condition halts execution. The system can behave in one of two ways. First, the system may ignore loops to encourage developers to fix their code. Developers will often quickly discover such loops and fix the problem causing the loop. Second, the system may avoid loops. For example, the system can ignore exceptions raised within a registered handler or can terminate execution of a handler that raises an exception and continue on to normal exception processing.

In some embodiments, the exception notification system allows registered handler functions to perform actions in addition to recording program state and logging information in response to an exception. For example, the system may allow the handler to return a value that stops execution or call functions that affect subsequent execution. For example, a handler could unload an AppDomain in which an exception occurred, causing the AppDomain to be marked for abort and terminated after the exception is processed. As another example, a host that invokes third-party code in plug-ins could prevent plug-ins from handling a particular type of exception that the application wants to handle by redirecting exception processing or marking plug-ins that raise the exception type so that the host does not load such plug-in in the future.

In some embodiments, if the exception notification system does not find a registered handler on the AppDomain on which the exception occurred, then the system looks for another AppDomain. For example, the system may marshal the exception to the next domain on the stack to find an AppDomain to notify about the exception. If the exception reaches another AppDomain, the exception notification system notifies that AppDomain's notification callbacks (if any). This may be useful in hosting situations where an exception occurs within the AppDomain of a plug-in but the hosting application wants to receive notification of the exception. The system may also provide a notification on thread marshaling changes so that a hosting application can detect that the exception its handler receives was caused in a different AppDomain.

An example of using the exception notification system follows. Microsoft SQL Server (SQL) administrators manage diverse databases running in a single server process. One cause of instability is unexpected exceptions. SQL allows administrators to execute a callback when a native exception is raised (exposed through the −y switch). This enables administrators to create custom logs and context dumps for native exceptions. However, today this cannot be done for managed exceptions. This notification described herein allows SQL to provide a callback with the same first-chance callback functionality for managed exceptions as SQL provides for native exceptions.

In some embodiments, the exception notification system allows program code to register for specific types of exceptions, so that the registered handler does not receive insignificant or uninteresting exception types. For example, a program may not be interested in minor exceptions (e.g., a failure to open a file) but may be interested in more serious errors (e.g., an access violation or out of memory condition).

In some embodiments, the exception notification system allows programs to turn on and off calling of the handler. Many applications produce many exceptions at certain times. The program may not want to log all of these exceptions, so may wait for program startup to complete then turn on calling of the handler. Likewise, the program may be uninterested in exceptions that occur during program shutdown and may turn calling of the handler off before starting a shutdown process.

From the foregoing, it will be appreciated that specific embodiments of the exception notification system have been described herein for purposes of illustration, but that various modifications may be made without deviating from the spirit and scope of the invention. Accordingly, the invention is not limited except as by the appended claims.

We claim:

1. A computer-implemented method for providing notification of an exception, the method comprising:
receiving notification that an exception has been raised during execution of an application;
detecting a runtime exception handler associated with a frame in which the exception occurred;
identifying a runtime thread object associated with the exception;
identifying an application object associated with the identified thread object;
invoking an exception notification handler associated with the identified application object; and
performing normal exception handling to process the exception and to clean up allocated objects,
wherein the preceding steps are performed by at least one processor.

2. The method of claim 1 wherein receiving notification that an exception has been raised comprises calling an operating system-provided function for raising a software exception.

3. The method of claim 1 wherein receiving notification that an exception has been raised comprises receiving notification of a hardware exception generated by hardware.

4. The method of claim 1 further comprising, after receiving notification that an exception has been raised, detecting whether a debugger is attached to the application, and in response to determining that a debugger is attached to the application, notifying the attached debugger to give the debugger a first option to process the exception.

5. The method of claim 1 further comprising detecting a type associated with the exception, wherein detecting a type comprises mapping an operating system provided code to a runtime type.

6. The method of claim 1 further comprising detecting a type associated with the exception and providing an object of the detected type to the exception notification handler.

7. The method of claim 1 wherein identifying a runtime thread object comprises identifying an appropriate thread object from the stack frame of the thread where the exception occurred that stores data about the thread managed by the runtime, and wherein identifying an application object comprises identifying an application domain object that represents an isolation boundary of an application.

8. The method of claim 1 wherein invoking the handler comprises identifying a handler previously registered through a method of the application object.

9. The method of claim 1 wherein invoking the handler occurs before performing exception processing that modifies application state related to the exception.

10. A computer system for providing an exception-raised notification outside of a path for handling the exception, the system comprising: a processor and memory configured to execute software instructions comprising: a handler registration component configured to receive requests from applications to register a handler that receives an early notification provided by the system in response to an exception occurs; an exception detection component configured to detect that an exception was raised while a program was executing; an object discovery component configured to look up an exception state in response to a detected exception and identify an application object associated with the exception; an exception notification component configured to call one or more registered application handlers to notify the handlers about the detected exception before exception handling occurs; and an exception-handling component configured to perform exception handling after the registered application handlers have been notified.

11. The system of claim 10 wherein the handler registration component is further configured to identify the handler based on a class of which the handler is a method.

12. The system of claim 10 wherein the handler registration component is further configured to determine a security level of a caller of a handler registration function and deny registration if the caller is below a threshold security level.

13. The system of claim 10 wherein the exception detection component is further configured to register a runtime handler function to be notified by an operating system when the exception is raised.

14. The system of claim 10 wherein the object discovery component is further configured to determine a type of the exception in a hierarchy of exception classes.

15. The system of claim 10 wherein the exception notification component is further configured to provide an exception object as a parameter to the registered handler through which the handler can retrieve additional information about the cause of the exception.

16. The system of claim 10 wherein the exception handling component is further configured to perform a two-pass exception process that, during the first pass, walks the stack to find an exception handling block that will accept an exception of the raised type, and, during the second pass, calls handlers for cleaning up application state from the bottom of the stack where the exception occurred to a frame of the accepting handler.

17. The system of claim 10 wherein the exception handling component is further configured to perform a single-pass exception process.

* * * * *